(12) United States Patent
Salbaum et al.

(10) Patent No.: US 7,326,341 B2
(45) Date of Patent: Feb. 5, 2008

(54) MEMBRANE FILTER PRESS

(75) Inventors: Bernhard Salbaum, Mühlstetten (DE); Ulrich Knye, Sonneberg (DE); Manfred P. Hermann, Nürnberg (DE)

(73) Assignee: JVK Filtration Systems GmbH, Georgsmuend (DE)

( * ) Notice: Subject to any disclaimer, the term of this patent is extended or adjusted under 35 U.S.C. 154(b) by 16 days.

(21) Appl. No.: 11/127,728

(22) Filed: May 12, 2005

(65) Prior Publication Data

US 2005/0247616 A1  Nov. 10, 2005

Related U.S. Application Data

(63) Continuation of application No. PCT/EP03/12269, filed on Nov. 4, 2003.

(30) Foreign Application Priority Data

Nov. 12, 2002 (DE) ................... 102 52 922

(51) Int. Cl.
*B01D 25/00* (2006.01)
*B01D 25/12* (2006.01)
*B01D 25/176* (2006.01)

(52) U.S. Cl. .............. 210/224; 210/227; 210/228; 210/229; 210/230; 210/231

(58) Field of Classification Search .............. 210/224, 210/227, 228, 229, 230, 231, 232
See application file for complete search history.

(56) References Cited

U.S. PATENT DOCUMENTS

| 4,508,623 | A |   | 4/1985 | Heckl et al. |   |
|---|---|---|---|---|---|
| 4,608,164 | A | * | 8/1986 | Neu | 210/231 |
| 4,826,593 | A | * | 5/1989 | Nev | 210/229 |
| 5,051,179 | A | * | 9/1991 | Hermann | 210/228 |
| 5,601,709 | A |   | 2/1997 | Ruhland |   |
| 5,603,827 | A | * | 2/1997 | Hermann et al. | 210/230 |
| 6,387,282 | B1 |  | 5/2002 | Heckl et al. |   |

FOREIGN PATENT DOCUMENTS

| DE | 32 09 341 A1 | 9/1983 |
| DE | 44 19 865 C1 | 6/1995 |
| DE | 196 36 436 C2 | 3/1998 |
| DE | 198 43 028 A1 | 3/2000 |
| EP | 0 827 766 A1 | 3/1998 |
| EP | 0 978 304 A2 | 2/2000 |
| WO | 98/17367 | 4/1998 |

* cited by examiner

*Primary Examiner*—John Kim
(74) *Attorney, Agent, or Firm*—Laurence A. Greenberg; Werner H. Stemer; Ralph E. Locher (57) ABSTRACT

The invention relates to a membrane filter press. On operation of such a press a secure generation of the necessary pressing pressure can be guaranteed with a membrane filter press that has at least one membrane filter plate, a baseplate with thickened edge region, a membrane made from an elastically-deformable material, and a filter cloth. The novel membrane has an annular edge bead which lies in a complementary groove on the baseplate. A sealing groove is formed into the baseplate which opens out into the first-mentioned groove at both ends in the manner of a bypass. A complementary sealing projection, moulded on the annular bead, engages in the sealing groove with formation of a seal. The cavity enclosed between the groove and the sealing groove is preferably provided with at least one filtrate drain bore.

13 Claims, 6 Drawing Sheets

MEMBRANE FILTER PRESS

CROSS-REFERENCE TO RELATED APPLICATION

This is a continuing application, under 35 U.S.C. § 120, of copending international application No. PCT/EP2003/012269, filed Nov. 4, 2003, which designated the United States; this application also claims the priority, under 35 U.S.C. § 119, of German patent application No. 102 52 922.1, filed Nov. 12, 2002; the prior applications are herewith incorporated by reference in their entirety.

BACKGROUND OF THE INVENTION

Field of the Invention

The invention relates to a membrane filter press which conventionally comprises a plurality of membrane filter plates and membrane-free filter plates arranged between them. In the operating state, the filter plates are tension-mounted between a head piece and an end piece and are configured in such a way that a filter space is arranged between them. Those faces of the filter plates which delimit the filter space are equipped with bosses or grooves and are covered with a filter cloth. The bossed or grooved surface is formed, in the membrane filter plates, by a flexible or elastically deformable membrane consisting of rubber or plastic. The rear side of the membrane can be acted upon with a pressure medium in order to remove the residual moisture of a filter cake formed in the filter space during filtration.

When the membrane rear side is acted upon by pressure with a pressure medium, an insufficient build-up of pressure force may occur, for example, because a pressure space is leaky due to material fatigue. If pressure medium can escape from the pressure space, effective pressure filtration is no longer possible on account of the lower pressure force. Moreover, this may lead to a contamination of the filtrate by the pressure medium.

SUMMARY OF THE INVENTION

It is accordingly an object of the invention to provide a membrane filter press, which overcomes the above-mentioned disadvantages of the heretofore-known devices and methods of this general type and which ensures reliable build-up of the required pressure force.

With the foregoing and other objects in view there is provided, in accordance with the invention, a membrane filter press, which comprises at least one membrane filter plate, a baseplate with a thickened edge region, a membrane consisting of an elastically deformable material and a filter cloth. The membrane has an edge-standing annular bead seated in a complementarily configured groove of the baseplate. At the same time, the baseplate has introduced in it a sealing groove which issues into the groove at both ends in the manner of a bypass. A complementarily configured sealing projection integrally formed onto the annular bead engages sealingly into the sealing groove. Since the membrane is seated with a sealing projection in the sealing groove, the membrane is prevented from lifting off from the baseplate as a result of the action of pressure upon the rear side of the membrane. The pressure medium cannot flow out via the filtrate run-off bore at the parting plane between the membrane inside and the baseplate, but, instead, remains reliably in the pressure space. A reduction in the pressure force on the membrane is thereby ruled out. The required pressure force can be built up reliably. At the same time, by the pressure space being sealed off, a contamination of the filtrate with pressure medium is prevented.

In accordance with an added feature of the invention, the baseplate, between the groove and the sealing groove, is formed with at least one filtrate run-off bore which is connected to a bore passing through the membrane and likewise serves for discharging the filtrate. This ensures a reliable filtrate run-off. At the same time, this measure provides a sealing off of the filtrate run-off bore.

In accordance with an additional feature of the invention, the membrane has an edge-standing annular bead of substantially dovetail-shaped cross section, which is seated in a complementarily configured groove arranged in the baseplate. The same applies to the interaction of sealing projection and sealing groove. The dovetail shape achieves particularly reliable sealing off.

Moreover, in filter presses of the type mentioned, the fixing of the filter cloth in the case of a driptight version presents problems. It is known, for example, to lead the filter cloth outward between two filter plates bearing against one another, the filter cloth serving for sealing off the parting plane present between the filter plates. The two filter cloths assigned to a filter plate are often connected to one another with their edges lying outside the filter plates by means of loops or a touch-and-close fastening. Such a design is unfavorable not only because of the lack of driptightness, but also from a hygienic point of view. To be precise, microorganisms may enter the filter press via the filter cloths. In other press versions, the filter cloth is fastened to that edge of the membrane filter plate which is outwardly adjacent to the membrane. This has the advantage, inter alia, that, because of the space requirement necessary for this purpose, the filtration area of the filter plate is reduced. Moreover, this type of cloth fastening requires an increased outlay in assembly terms.

For this reason, in accordance with a particularly advantageous embodiment of the invention, we proposed a membrane, in the annular bead of which there is arranged a fixing groove wherein a fixing strip is seated. The filter cloth is in this case fixed indirectly or directly with its edge region to this fixing strip. The fastening of the membrane and of the filter cloth are thereby interlinked, thus reducing the number of parts necessary for fixing. This, however, also makes mounting and demounting easier. Furthermore, this type of cloth fixing does not need any space requirement in the plate edge region. Consequently, a larger membrane with a correspondingly larger useful filtration area can be employed and the filtration capacity increased. A penetration of hygienically harmful germs via the filter cloth is prevented. As a result of this cloth fastening, the membrane filter plate is improved, particularly with regard to the number of parts and to the outlay in terms of mounting and demounting.

A form fit between the fixing groove and the fixing strip—with the form fit being effective transversely with respect to the plane of the baseplate—is expedient, because this ensures a particularly reliable cloth fixing which, in particular, is effective even in the opened state of the filter press. In this respect, a force fit between the parts also takes effect, for example due to restoring forces as result of widening of the fixing groove by the fixing strip. Hermetic sealing off, preventing the penetration of microorganisms, is thereby also achieved. Furthermore, the annular bead of the membrane is keyed in the dovetail-shaped groove of the baseplate and the clamping action of the fixing strip holding the filter cloth is increased. At the same time, a sealing off preventing the penetration of microorganisms occurs in the fixing region and is essential particularly when a filter press is employed for the production of foodstuffs, pharmaceutical products or toxic substances.

In accordance with a further feature of the invention, the fixing region in question is preferably configured in such a way that the fixing strip and the filter cloth do not project, in the region of the membrane bead, beyond the plane spanned by the edge region of the baseplate. This ensures that the filter cloth and filter strip do not impede the bearing of filter plates against one another in their edge region, so that a mutual hermetic sealing off of the filter plates, for example by a sealing ring being interposed, is possible in a simple way.

In accordance with another feature of the invention, the fixing strip fills the fixing groove substantially completely. This feature aims at avoiding gap spaces capable of being contaminated with microorganisms.

As already mentioned above, the outward sealing off of the filter press takes place in the region of the edge region of the filter plates. Preferably, then, the membrane bead is provided with a sealing lip which surrounds the fixing groove, that is to say lies radially outside the fixing groove, and which projects beyond the plane spanned by the baseplate edge region. The sealing lip can therefore cooperate with a counterplate with the effect of a hermetic sealing off. Additional structural measures, such as the introduction of a sealing groove into the filter plate and the insertion of a sealing cord, may therefore be dispensed with. The annular bead of the membrane thus has a threefold function: it serves for fastening the membrane and at the same time the filter cloth and, furthermore, ensures that the filter chamber and the space behind the membranes are sealed off outwardly. The number of parts necessary for a membrane filter plate is thereby further reduced. The outlay in terms of production and the outlay in terms of the mounting and demounting of the filter cloth and the membrane are correspondingly low.

Various possibilities are disclosed for fixing the filter cloth. For example, an edge of the filter cloth is clamped between the fixing strip and the fixing groove. In a preferred embodiment, the edge of the filter cloth is formed as a hemstitch, and the fixing strip is seated in the edge of the filter cloth. It is also possible for the edge of the filter cloth to be integrally connected to the fixing strip, such as by gluing to an adhesive face of the fixing strip. Preferably, the adhesive face runs substantially parallel to a plane spanned by the edge region of the baseplate and is in alignment with a region of the annular bead of the membrane extending inwardly away from the plane.

Other features which are considered as characteristic for the invention are set forth in the appended claims.

Although the invention is illustrated and described herein as embodied in a membrane filter press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
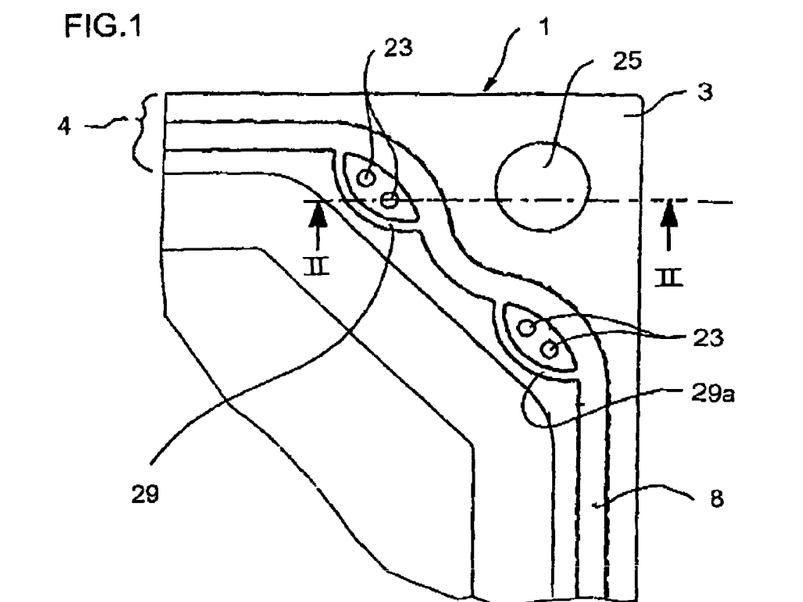
FIG. 1 shows a top view of a corner region of a membrane filter plate with the membrane removed.
Figure 2:
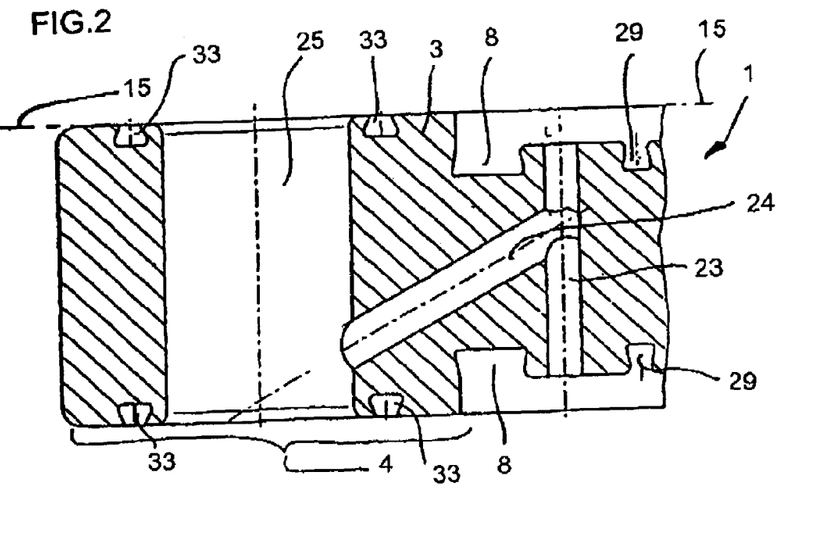
FIG. 2 is a cross section taken along the line II-II in FIG. 1.
Figure 3:
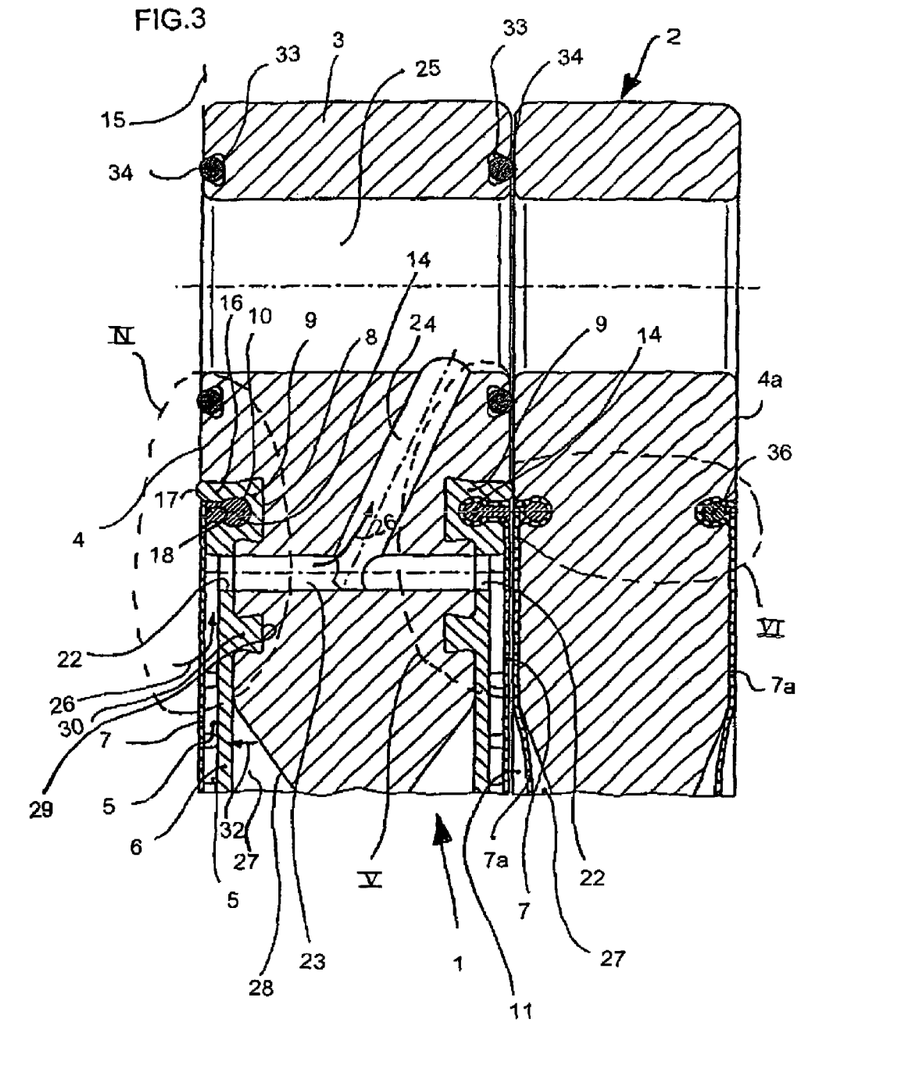
FIG. 3 is a cross section similar to FIG. 2, which shows the corner region of a membrane plate and of a membrane-free intermediate plate.

A filter press of the type in question is composed essentially of a plurality of membrane filter plates 1 and of membrane-free intermediate plates 2 disposed in each case between two membrane filter plates. Referring now to the figures of the drawing in detail and first, particularly, to FIGS. 1-3 thereof, a membrane filter plate 1 comprises a baseplate 3 with a thickened edge region 4, a membrane 6 fixed to the baseplate 3 and having bosses 5 on its outside and a filter cloth 7. The intermediate plates 2 likewise have a thickened edge region 4a. In the operating state, the plates are tension-mounted between a head piece and a non-illustrated end piece, and they bear with their edge regions 4, 4a against one another. The plate regions adjoining the edge region 4, 4a radially inward are drawn inward, so that a filter space 11 (FIG. 3) is formed between two plates cooperating with one another. To fix the membrane 6 to the baseplate 3, a reception recess or groove 8 of dovetail-shaped cross section is arranged in the edge region 4 of said baseplate. The groove 8 (referred to as a "first groove" herein) extends in the circumferential direction over the entire edge region, that is to say is has an annular configuration. The membrane 6 has an edge-standing annular bead 9 which has a cross-sectional shape corresponding substantially to the groove 8 and which is seated with a form fit (i.e., form lock, positive lock) in the groove 8. The insertion of the membrane 6 into the groove 8 in this case takes place with elastic deformation of the membrane 6 consisting of a rubber-like or elastic plastic. The restoring forces caused thereby bring about a force fit between the annular bead 9 and groove 8.

The terms "form lock" and "force lock" are defined as follows: A form-locking connection (i.e., form fit, positive lock) is one that connects two elements together due to the shape of the elements themselves, as opposed to a force-locking connection (i.e., force lock, friction lock), which locks the elements together by force external to the elements.

A fixing groove 10 is introduced into the annular bead 9 from the outside, carrying the bosses 5, of the membrane 6 and widens toward its groove bottom. This widening may be such that the groove walls 12 first run parallel to one another and then merge into a portion 13 of approximately circular cross section. In the fixing groove 10 is seated a fixing strip 14 which has a cross-sectional shape corresponding to the groove cross section. The cross-sectional dimensions of the fixing strip are in this case such that they are seated in the fixing groove 10, with the annular bead 9 being widened elastically. The strength of the connection between the membrane 6 and the baseplate 3, on the one hand, and between the fixing strip 14 and the fixing groove 10, on the other hand, is thereby increased. The filter cloth 7 is fixed to the fixing strip 14, so that the strength of the connection between the filter cloth 7 and membrane 6 is also increased in the way outlined. The fixing strip 14 fills the fixing groove 10 essentially completely, thus avoiding gaps or dead spaces which entail the risk of the accumulation of dirt and microorganisms.

The filter cloth 7 and fixing strip 14 are arranged in such a way that, in the closed state of the filter press, they initially do not project beyond the plane 15 spanned by the edge region 4 of the baseplate. This ensures that only the edge region 4 takes over the mutual planar bearing contact of the filter plates and assumes a sealing-off function possibly necessary there. The sealing-off function between the filter plates bearing against one another is assumed by the annular bead 9, so that additional sealing-off measures, that is to say grooves in the edge region and corresponding sealing rings, may be dispensed with. For this purpose, the radially outer wall 16 of the annular bead 9 is prolonged into a sealing lip 17 which projects beyond the plane 15. In the operating state, the sealing lip 17 stands against the edge region of a counterplate, for example an intermediate plate 2, and forms a structurally simple and efficient sealing off of the membrane filter press.

Figure 4:
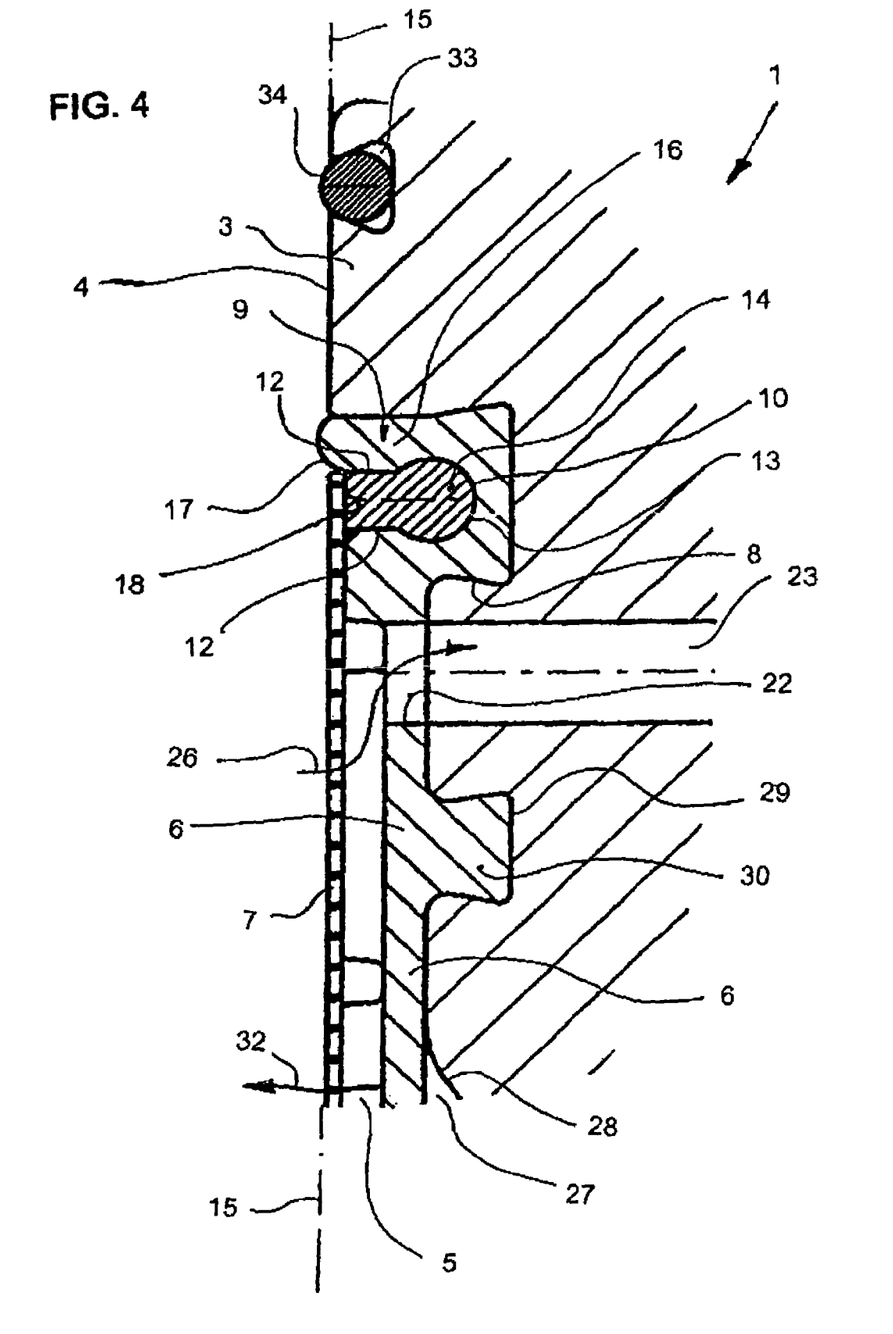
FIG. 4 shows the detail IV from FIG. 3.
Figure 5:
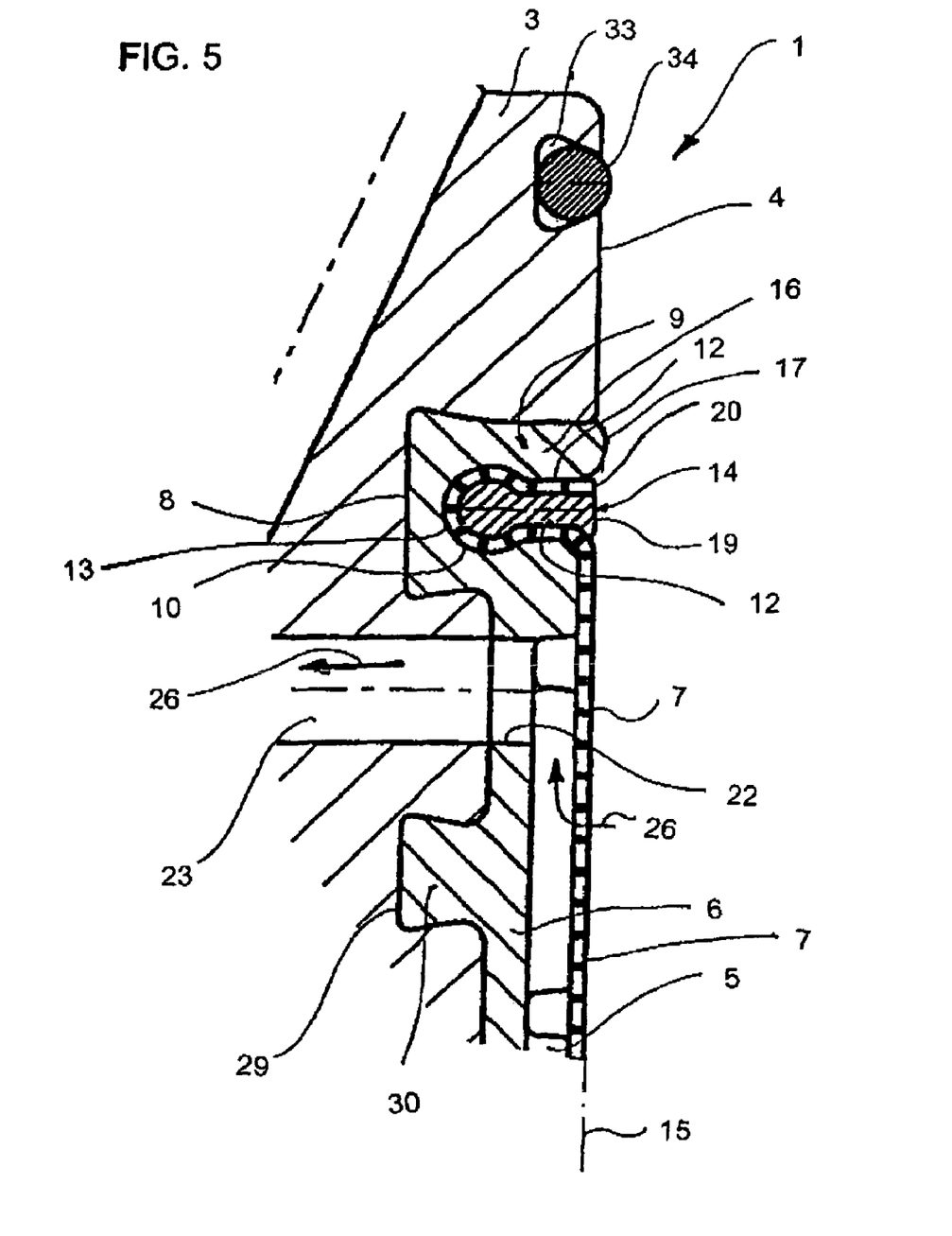
FIG. 5 shows the detail V from FIG. 3.

The filter cloth 7 may be fixed to the fixing strip 14 in various ways. In the exemplary embodiment according to FIG. 4, the top side, covering the fixing groove 10, of the fixing strip 14 seated with elastic widening in the fixing groove 10 forms an adhesive face 18 to which the filter cloth 7 is glued with its edge region. The connection between the filter cloth 7 and adhesive face 18 may, however, also be carried out by means of welding, for example when the two parts consist of plastics capable of being welded to one another. In the type of fastening illustrated in FIG. 5, the filter cloth 7 is inserted between the fixing strip 14 and the wall of the fixing grove 10. The fixing strip 14 is dimensioned such that the annular bead 9 is widened radially and, correspondingly, both the filter cloth 7 and the fixing strip 14 are clamped in the fixing groove by means of the restoring forces of the annular bead material. Furthermore, the top side 19 of the fixing strip 14 is arranged in the plane 15. The edge space 20 of the filter cloth 7 seated in the fixing groove 10 is likewise flush with the plane 15. A relatively planar sheetlike arrangement essentially free of gaps is thereby provided in the region of the annular bead 9.

Figure 7:
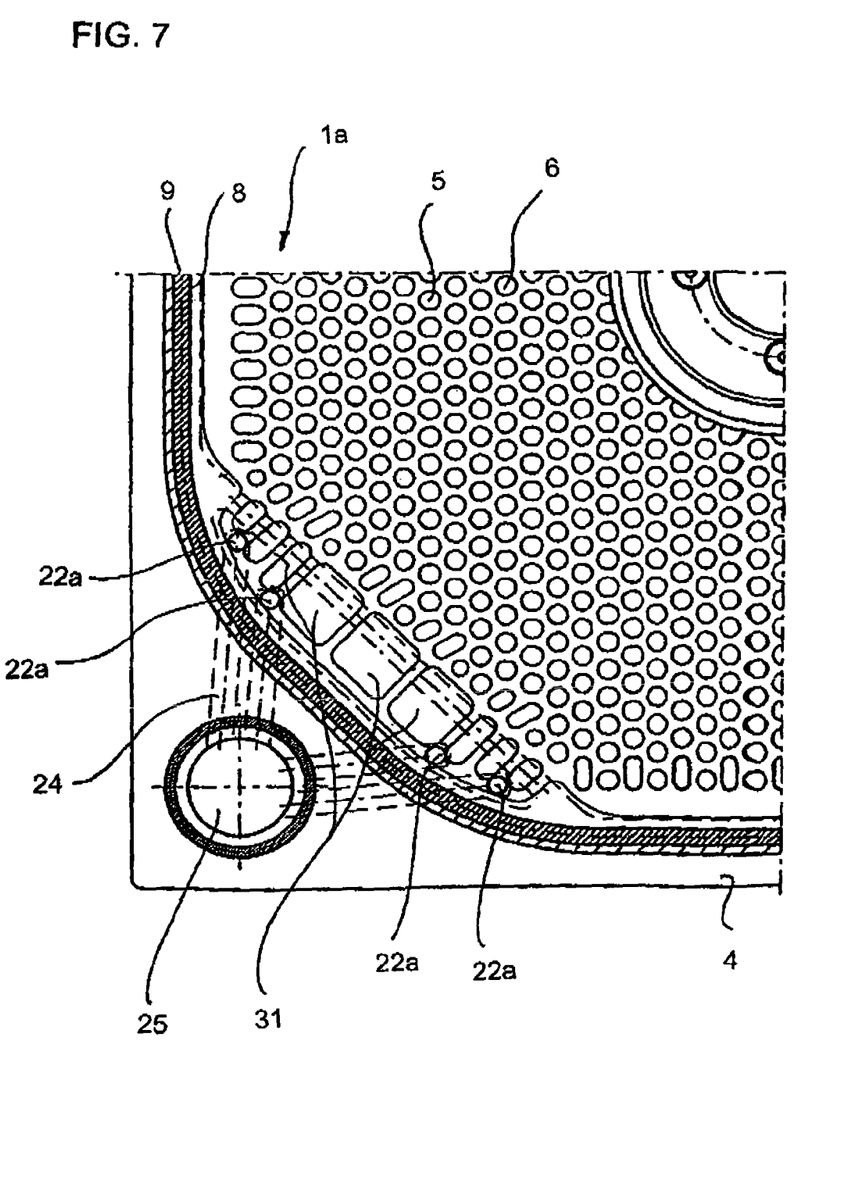
FIG. 7 shows the top view of a differently configured membrane plate with a membrane fastened to it.

In order to ensure a filtrate run-off, the membrane 6 has a plurality of bores 22 which are arranged near the annular bead 9 and which are in alignment with or fluidically connected to a filtrate run-off bore 23 passing transversely through the baseplate 3. The filtrate run-off bore 23 is itself connected via a connecting bore 24 to a filtrate duct 25 (FIGS. 1 and 2) arranged in the corner region of the baseplate 3. The filtrate accumulating between the filter cloth 7 and the membrane 6 or between the bosses 5 of the latter can therefore flow off in the direction of the arrow 26 via said bores. In order to ensure that the pressure space 27 present between the membrane 6 and the inwardly drawn baseplate region 28 and capable of being acted upon with pressure to press out a filter cake is sealed off with respect to the filtrate run-off bore, two sealing grooves 29, 29a of dovetail-shaped cross section are introduced in the edge region of the baseplate 3. The sealing grooves 29, 29a are in this case arranged in an inner region of the baseplate 3, said inner region being bordered by the groove 8. The sealing grooves issue into the groove 8 in each case at both ends in the manner of a bypass. A sealing projection 30 configured complementarily in cross section and integrally formed onto the annular bead 9 is seated in each of the sealing grooves 29, 29a with a form fit and preferably under elastic prestress. The design outlined prevents the membrane from lifting off from the baseplate surface in the direction of the arrow 32 (FIGS. 3 and 4) when pressure acts upon the pressure space 27, with the result that pressure medium may enter the filtrate run-off bore 23 via the gap space present between the membrane 6 and baseplate 3, which would impede the build-up of a required pressure force and, moreover, lead to pressure medium entering the filtrate. In the membrane filter plate 1a illustrated in FIG. 7, with a membrane 6 fixed to it, the just outlined additional sealing off of the bores 22a is absent. Here, the membrane is prevented from lifting off in the event of the action of pressure upon its rear side by a pressure medium, in that the membrane is supported on a counterplate, that is to say, for example, an intermediate plate 2, by means of supporting bosses 31 in the region assigned to the bores 22a.

That edge region of the baseplate 3 which surrounds the filtrate run-off duct 25 has an annular groove 33 of dovetail-shaped cross section wherein a sealing ring 34 for sealing off the filtrate run-off duct 25 is seated.

Figure 6:
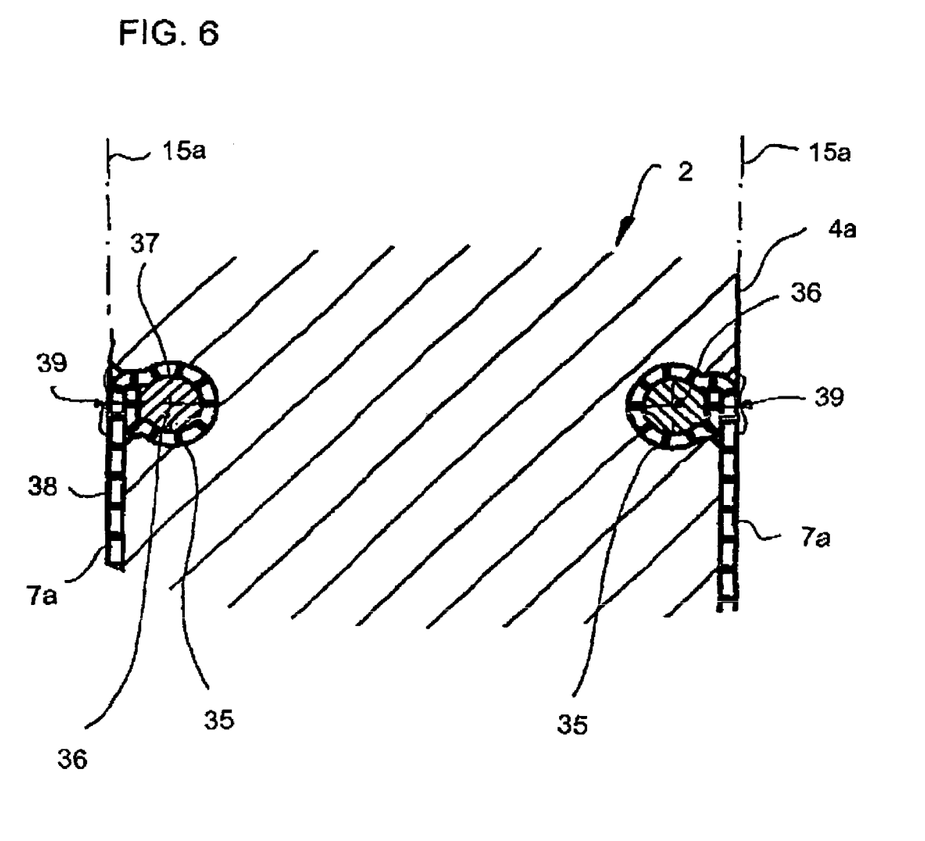
FIG. 6 shows the detail VI from FIG. 3.

The intermediate plate 2 has formed in it—on both sides—grooves 35 which are configured similarly to the fixing groove 10 of the membrane filter plates 1 and wherein clamping strips 36 of essentially circular cross section are seated, with the filter cloth 7a being interposed. The end of the filter cloth 7a is sewn together to form a hemstitch 37 which surrounds the clamping strip 36. Such a design is also possible with regard to the fixing strip 14 and to the filter cloth 7 of the membrane filter plate 1. The depth of the groove 35, the cross-sectional dimensions of the clamping strip 36 and the thickness of the filter cloth 7a are dimensioned such that the outside 38 of the filter cloth is in alignment with or does not appreciably project beyond the plane 15a spanned by the edge region 4a. The double ply 39, required for forming the hemstitch 37, of the filter cloth 7a is in this case arranged in the region of the groove 35.

We claim:

1. A membrane filter press with at least one membrane filter plate, comprising:
   a baseplate formed with a thickened edge region, said baseplate having a first groove formed therein and an inner region surrounded by said first groove, and a sealing groove formed in said baseplate within said inner region, said sealing groove having two ends each issuing into said first groove and defining a bypass;
   a membrane of elastically deformable material and a filter cloth mounted to said baseplate, said membrane having an edge-standing annular bead formed complementarily to and seated in said first groove of said baseplate, and a sealing projection integrally formed on said annular bead complementarily to said sealing groove and seated with a form fit in said sealing groove of said baseplate;
   said baseplate being formed, in a baseplate region bordered by said first groove and said sealing groove, with at least one filtrate run-off bore connected to a bore passing through said membrane.

2. The membrane filter press according to claim 1, wherein at least one of said annular bead and said sealing groove have a substantially dovetail-shaped cross section.

3. The membrane filter press according to claim 1, wherein said annular bead has a fixing groove formed therein and wherein a fixing strip is seated in said fixing groove and said filter cloth has an edge region fastened indirectly or directly to said fixing strip.

4. The membrane filter press according to claim 3, wherein said fixing strip is seated in said fixing groove with a form lock effective transversely with respect to a plane of said baseplate.

5. The membrane filter press according to claim 3, wherein said fixing strip is seated in said fixing groove with a force lock.

6. The membrane filter press according to claim 3, wherein said fixing strip and said filter cloth are disposed, in a region of said annular bead, to not project beyond a plane spanned by said edge region of said baseplate.

7. The membrane filter press according to claim 3, wherein said fixing strip is configured to fill said fixing groove substantially completely.

8. The membrane filter press according to claim 3, wherein said annular bead projects with a sealing lip surrounding said fixing groove beyond a plane spanned by said edge region of said baseplate.

9. The membrane filter press according to claim 3, wherein an edge of said filter cloth is clamped between said fixing strip and said fixing groove.

10. The membrane filter press according to claim 3, wherein an edge of said filter cloth is formed as a hemstitch, and said fixing strip is seated in said edge of said filter cloth.

11. The membrane filter press according to claim 3, wherein said edge of said filter cloth is integrally connected to said fixing strip.

12. The membrane filter press according to claim 11, wherein said edge of said filter cloth is glued to an adhesive face of said fixing strip.

13. The membrane filter press according to claim 12, wherein said adhesive face runs substantially parallel to a plane spanned by said edge region of said baseplate and is in alignment with a region of said annular bead of said membrane extending inwardly away from said plane.

* * * * *